United States Patent
Lindsay et al.

(10) Patent No.: US 10,176,641 B2
(45) Date of Patent: Jan. 8, 2019

(54) DISPLAYING THREE-DIMENSIONAL VIRTUAL OBJECTS BASED ON FIELD OF VIEW

(71) Applicant: MICROSOFT TECHNOLOGY LICENSING, LLC, Redmond, WA (US)

(72) Inventors: Megan Ann Lindsay, Kirkland, WA (US); Michael Scavezze, Bellevue, WA (US); Aaron Daniel Krauss, Snoqualmie, WA (US); Michael Thomas, Redmond, WA (US); Richard Wifall, Sammamish, WA (US); Jeffrey David Smith, Duvall, WA (US); Cameron Brown, Bellevue, WA (US); Charlene Jeune, Redmond, WA (US); Cheyne Rory Quin Mathey-Owens, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 76 days.

(21) Appl. No.: 15/299,247

(22) Filed: Oct. 20, 2016

(65) Prior Publication Data
US 2017/0270715 A1    Sep. 21, 2017

Related U.S. Application Data

(60) Provisional application No. 62/311,324, filed on Mar. 21, 2016.

(51) Int. Cl.
*G06T 15/00* (2011.01)
*G06T 19/00* (2011.01)
(Continued)

(52) U.S. Cl.
CPC ............ *G06T 19/006* (2013.01); *G06F 3/011* (2013.01); *G06F 3/0482* (2013.01);
(Continued)

(58) Field of Classification Search
None
See application file for complete search history.

(56) References Cited

U.S. PATENT DOCUMENTS 9,129,430 B2     9/2015  Salter et al.
9,165,318 B1 *  10/2015  Pauley ............... G06Q 30/0643
(Continued)

FOREIGN PATENT DOCUMENTS

| EP | 0899690 A2 | 3/1999 |
| EP | 1477935 A1 | 11/2004 |
| WO | 2014182545 A1 | 11/2014 |

OTHER PUBLICATIONS

"International Search Report and Written Opinion Issued in PCT Application No. PCT/US2017/022223", dated Aug. 10, 2017, 20 Pages. (MS# 359460-WO-PCT).
(Continued)

*Primary Examiner* — Andrew G Yang
(74) *Attorney, Agent, or Firm* — Alleman Hall Creasman & Tuttle LLP

(57) ABSTRACT

Examples disclosed relate to displaying virtual objects. One example provides, on a display device comprising a camera and a display, a method comprising acquiring, via the camera, image data imaging an environment, receiving a user input requesting display of a three-dimensional virtual object, comparing dimensional information for the three-dimensional virtual object to dimensional information for a field of view of the display device, modifying the three-dimensional virtual object based upon comparing the dimensional information for the three-dimensional virtual object to
(Continued)

the dimensional information for the field of view to obtain a modified three-dimensional virtual object, and displaying the modified three-dimensional virtual object via the display.

20 Claims, 12 Drawing Sheets

(51) Int. Cl.
| | |
|---|---|
| *G06F 3/01* | (2006.01) |
| *G06F 3/0482* | (2013.01) |
| *G06K 9/62* | (2006.01) |
| *G06T 7/00* | (2017.01) |
| *G06T 7/20* | (2017.01) |
| *G06T 7/60* | (2017.01) |
| *G06T 19/20* | (2011.01) |

(52) U.S. Cl.
CPC .......... *G06K 9/6201* (2013.01); *G06T 7/004* (2013.01); *G06T 7/0085* (2013.01); *G06T 7/20* (2013.01); *G06T 7/60* (2013.01); *G06T 19/20* (2013.01); *G06T 2207/10028* (2013.01); *G06T 2210/12* (2013.01)

(56) References Cited

U.S. PATENT DOCUMENTS

| | | | |
|---|---|---|---|
| 9,245,387 B2 | 1/2016 | Poulos et al. | |
| 2003/0025676 A1* | 2/2003 | Cappendijk | G06F 3/04886 345/173 |
| 2006/0209021 A1* | 9/2006 | Yoo | G06F 3/017 345/156 |
| 2011/0248987 A1* | 10/2011 | Mitchell | G06T 15/20 345/419 |
| 2012/0113092 A1* | 5/2012 | Bar-Zeev | G02B 27/017 345/419 |
| 2012/0129590 A1* | 5/2012 | Morrisroe | A63F 13/65 463/25 |
| 2013/0286004 A1 | 10/2013 | McCulloch et al. | |
| 2013/0342572 A1* | 12/2013 | Poulos | G02B 27/017 345/633 |
| 2014/0002444 A1 | 1/2014 | Bennett et al. | |
| 2014/0104320 A1* | 4/2014 | Davidson | G09G 5/32 345/681 |
| 2014/0132484 A1* | 5/2014 | Pandey | G02B 27/0172 345/8 |
| 2014/0282220 A1* | 9/2014 | Wantland | G06F 3/04845 715/782 |
| 2014/0333666 A1* | 11/2014 | Poulos | G06T 19/006 345/633 |
| 2015/0029223 A1* | 1/2015 | Kaino | G06T 19/006 345/633 |
| 2015/0049201 A1 | 2/2015 | Liu et al. | |
| 2015/0153913 A1 | 6/2015 | Ballard et al. | |
| 2015/0302655 A1 | 10/2015 | Miller et al. | |
| 2015/0381974 A1 | 12/2015 | Hoffman et al. | |
| 2016/0012631 A1* | 1/2016 | Kim | G06T 19/006 345/419 |
| 2016/0033770 A1 | 2/2016 | Fujimaki et al. | |
| 2016/0224123 A1* | 8/2016 | Antoniac | G06F 3/017 |
| 2016/0274762 A1* | 9/2016 | Lopez | G06T 19/006 |

OTHER PUBLICATIONS

"Emersio", Retrieve on: Mar. 29, 2016, Available at: http://www2.emersio.com/.

Sams, Brad, "HoloLens 'Start Menu' Uncovered in Actiongram Videos", Published on: Feb. 23, 2016, Available at: https://www.thurrott.com/hardware/64804/hololens-start-menu-uncovered-in-actiongram-videos.

Gallagher, Sean, "Microsoft's new interface: Freaking Holograms", Published on: Jan. 22, 2015, Available at: http://arstechnica.com/gadgets/2015/01/microsofts-new-interface-freaking-holograms/.

"NMY", Published on: Jun. 9, 2014, Available at: http://www.nmy.de/en/2/solutions/60/98/augmented-reality-apps/.

"HoloLens and Field of View in Augmented Reality", Published on: Aug. 18, 2015, Available at: http://doc-ok.org/?p=1274.

Jacoby, et al., "Using Virtual menus in a Virtual Environment", In Proceedings of SPIE, Visual Data Interpretation, vol. 1668, Jun. 1992, 10 pages.

Yoon, et al., "Augmented Reality Game Interface Using Hand Gestures Tracking", In Journal of Korea Game Society, vol. 6, Issue 2, Jun. 2006, 2 pages.

Sugiura, et al., "Dynamic 3D Interaction using an Optical See-through HMD", In Proceedings of IEEE Virtual Reality, Mar. 23, 2015, pp. 1-13.

\* cited by examiner

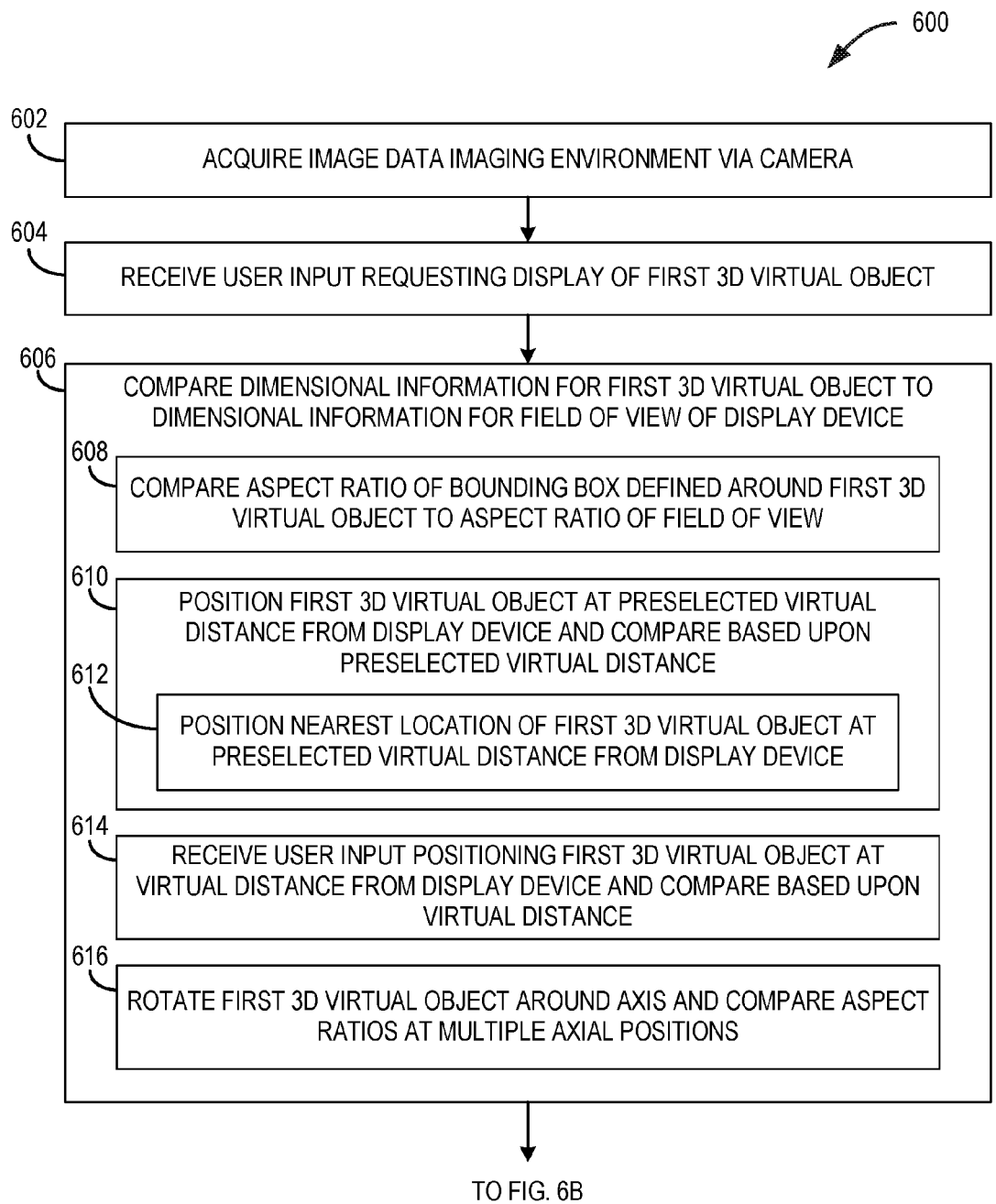

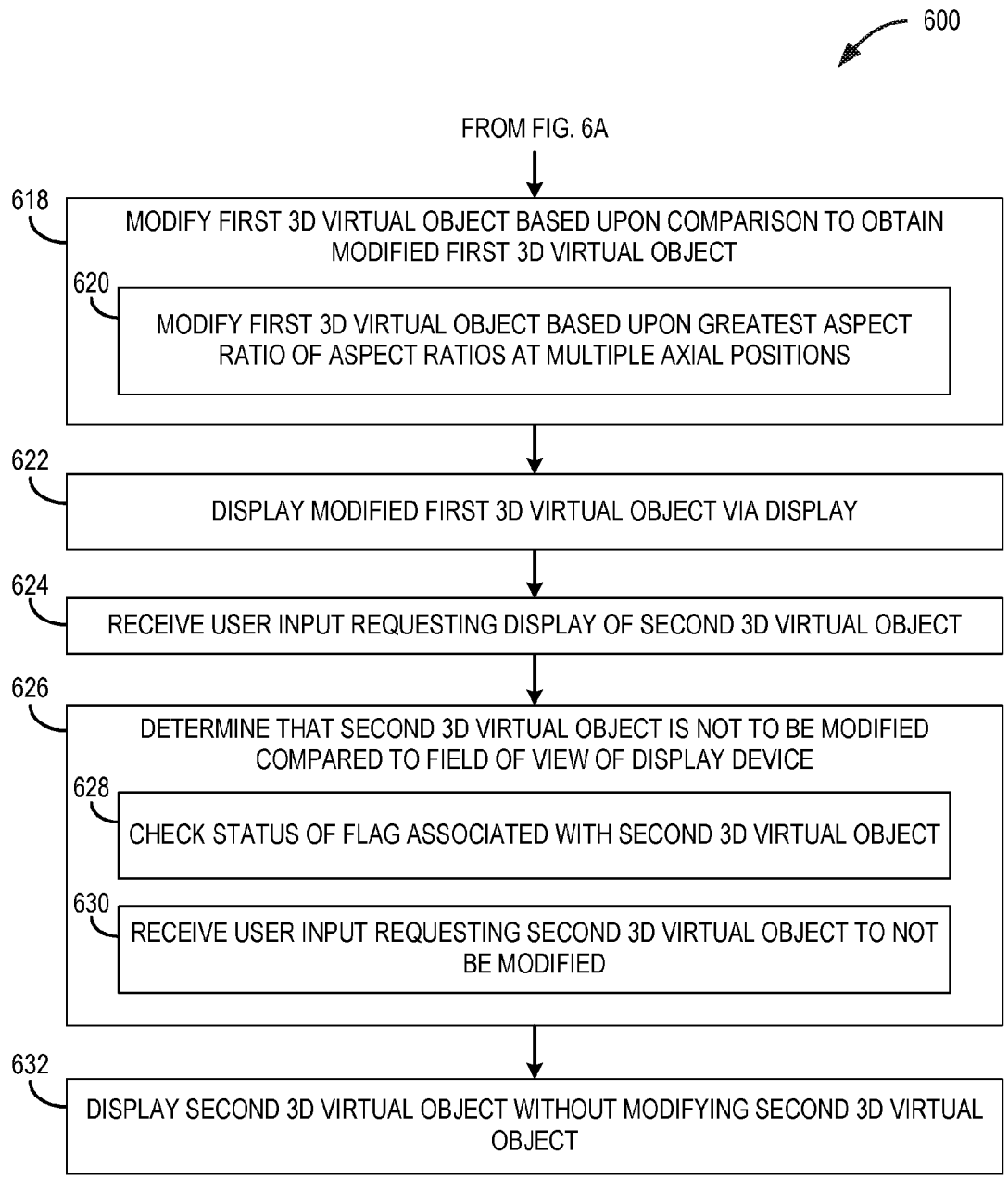

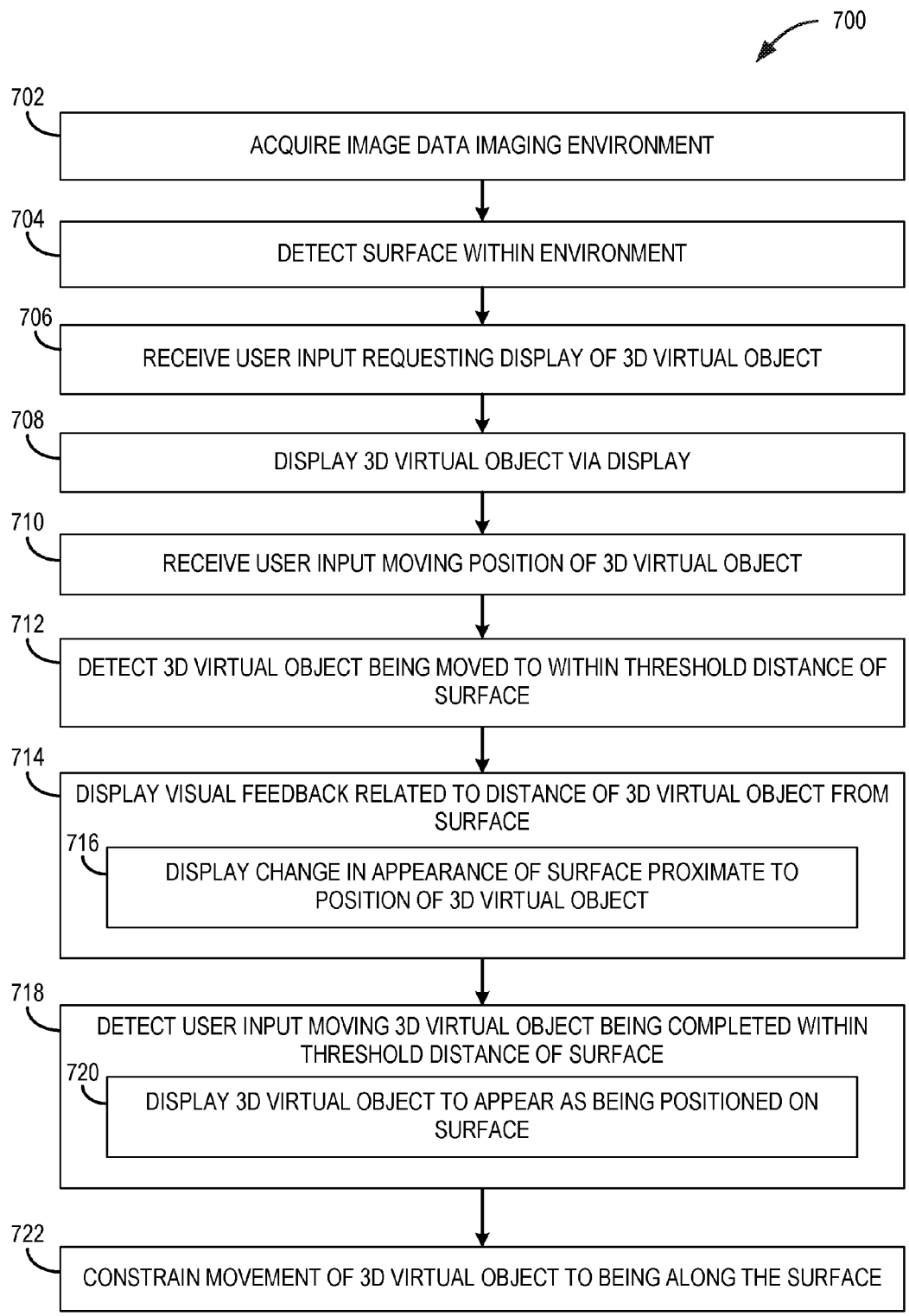

DISPLAYING THREE-DIMENSIONAL VIRTUAL OBJECTS BASED ON FIELD OF VIEW

CROSS REFERENCE TO RELATED APPLICATIONS

This application claims priority to U.S. Provisional Application Ser. No. 62/311,324, filed on Mar. 21, 2016, the entire contents of which are hereby incorporated herein by reference for all purposes.

BACKGROUND

Mixed reality display systems, such as head-mounted display systems, may be configured to present virtual imagery superimposed over a view of a real world background to provide an immersive visual experience.

SUMMARY

Examples are disclosed herein that relate to displaying three-dimensional virtual objects. One example provides, on a display device comprising a camera and a display, a method comprising acquiring, via the camera, image data imaging an environment, receiving a user input requesting display of a three-dimensional virtual object, comparing dimensional information for the three-dimensional virtual object to dimensional information for a field of view of the display device, modifying the three-dimensional virtual object based upon comparing the dimensional information for the three-dimensional virtual object to the dimensional information for the field of view to obtain a modified three-dimensional virtual object, and displaying the modified three-dimensional virtual object via the display.

Another example provides a display device comprising a camera, a display, a logic subsystem, and a storage subsystem comprising instructions that are executable by the logic subsystem to acquire image data imaging an environment via the camera, from the image data detect a surface within the environment, receive a user input requesting display of a three-dimensional virtual object, display the three-dimensional virtual object via the display, receive a user input moving a position of the three-dimensional virtual object, detect the three-dimensional virtual object being moved to within a threshold distance of the surface, display the three-dimensional virtual object to appear as being positioned on the surface, and constrain movement of the three-dimensional virtual object to being along the surface.

Yet another example provides a display device comprising a depth camera, a display, a logic subsystem, and a storage subsystem comprising instructions that are executable by the logic subsystem to acquire image data of an environment and monitor the environment via the camera, detect the presence of a physical hand in the environment, and in response, automatically display a menu via the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A-6B show a flow diagram illustrating an example method of displaying three-dimensional virtual objects with respect to a field of view of a display device.

FIG. 7 shows a flow diagram illustrating an example method of displaying a three-dimensional virtual object to appear as being positioned on a surface.

DETAILED DESCRIPTION

Figure 1:
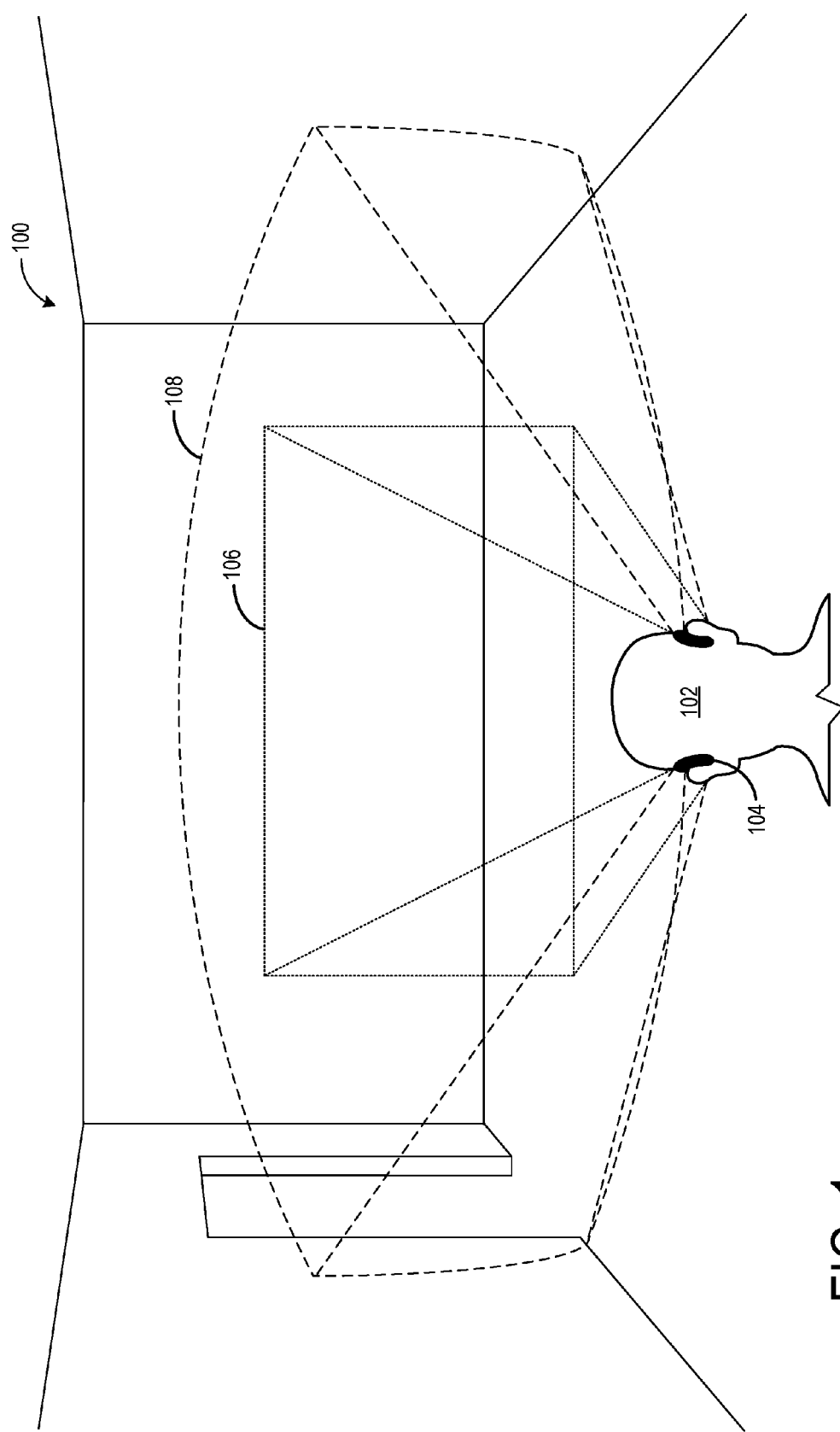
FIG. 1 shows an example use scenario for an example head-mounted display device, and illustrates a field of view of a see-through display of the head-mounted display device compared to a field of view of a user's eye looking through the see-through display.

Augmented reality display devices may present virtual objects superimposed over a real world environment. FIG. 1 shows an example use environment 100 in which a user 102 is using an augmented reality display device in the form of a head-mounted display device (HMD) 104 having a see-through display device. The HMD 104 is configured to display virtual objects within a field of view 106 ("HMD field of view"), which may be smaller than a field of view 108 of the user 102 ("user field of view") looking through the see-through display device. As such, in some instances, only a portion of a three-dimensional virtual object being displayed by the HMD 104 may be viewable within the HMD field of view 106, which may provide an incomplete view of the object to the user.

Accordingly, examples are disclosed herein that relate to modifying of three-dimensional virtual objects to fit within the field of view of an augmented reality display device. The disclosed examples allow a display device to automatically scale a three-dimensional virtual object when suitable, and also to determine when modifying of a three-dimensional virtual object would not be suitable and thus display the three-dimensional virtual object without modification. The disclosed examples further provide for positioning a three-dimensional virtual object appropriately with regard to the real world, such as automatically positioning a three-dimensional virtual object to appear as being positioned on a real world surface. Examples are also disclosed relating to automatically displaying a virtual user interface, such as a menu, based on the detected presence of a user's hand in image data acquired by the HMD 104.

The HMD 104 includes one or more outward-facing image sensors configured to acquire image data of the environment 100. Examples of such image sensors include, but are not limited to, depth sensor systems (e.g. time-of-flight, structured light camera(s), and/or stereo camera arrangements), and two-dimensional image sensors (e.g. RGB and/or grayscale sensors). Such image sensor(s) may be configured to detect images in visible, infrared and/or other suitable wavelength range(s). The acquired image data may be utilized to obtain a three-dimensional representation of the environment 100 for use in displaying and positioning three-dimensional virtual objects appropriately. As a non-limiting example, the HMD 104 may be configured to obtain a three-dimensional surface reconstruction mesh of the environment 100 as constructed from acquired depth data. As another example, the HMD 104 may retrieve a previously constructed, stored three-dimensional representation of the environment from a local storage subsystem residing on the HMD, or from a remote computing device, based upon a current location of the HMD. While shown in FIG. 1 as a head-mounted display device, it will be understood that any other suitable display device may be used.

The HMD 104 may obtain content for display from any suitable source, such as from a remote server over a network, from one or more peer computing devices (e.g. peer HMDs), or from local storage. Likewise, the HMD may display any suitable type of content including but not limited to virtual object models representing three-dimensional virtual objects. A three-dimensional virtual object may be displayed in a variety of ways. For example, a three-dimensional virtual object may be displayed in a world-locked view relative to the real world environment 100. The term "world-locked" as used herein signifies that the three-dimensional virtual object is displayed as positionally fixed relative to real world objects (although this position may be user-adjusted in some examples). This may allow a user to move within the environment 100 to view a displayed three-dimensional virtual object from different perspectives, for example, as if the user were walking around a real object. A three-dimensional virtual object also may be displayed in a "device-locked" view, such that its position is fixed relative to the HMD display.

Figure 2A:
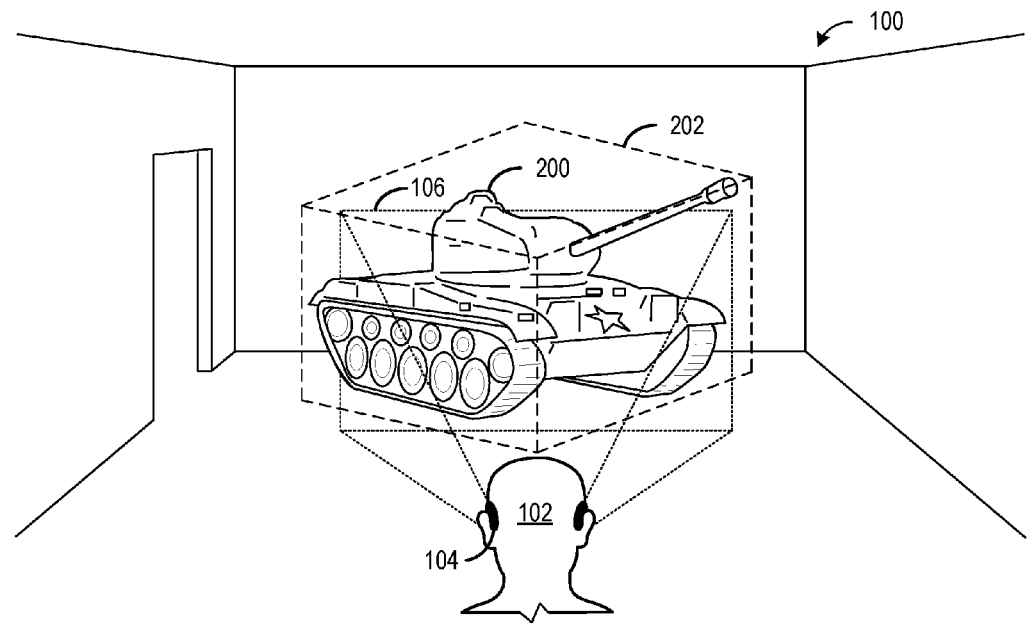
FIG. 2A illustrates an original scale of an example three-dimensional virtual object compared to a field of view of the head-mounted display device.
Figure 2B:
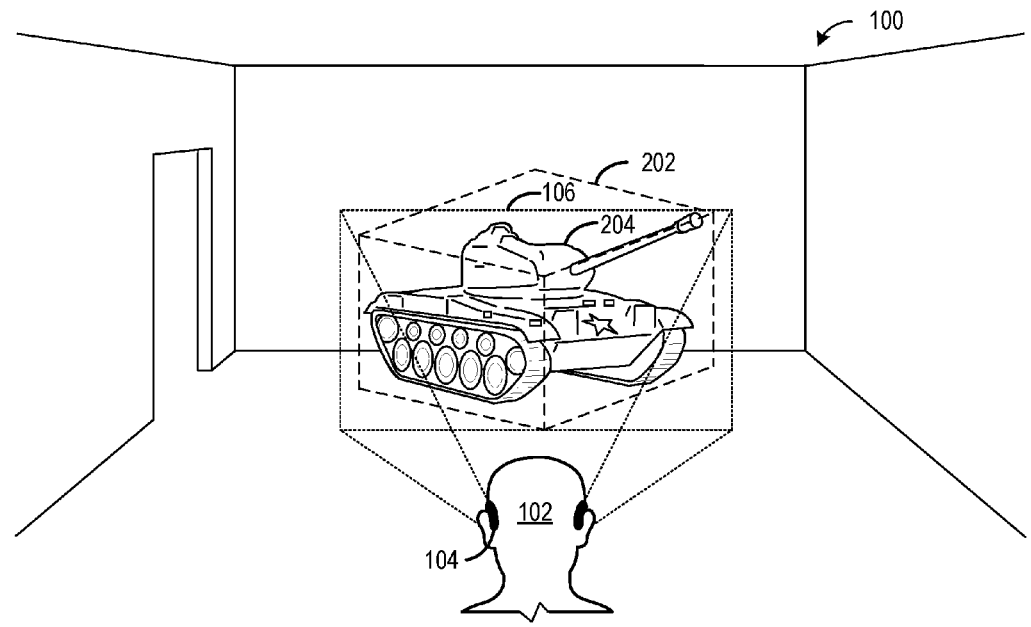
FIG. 2B illustrates an example of the three-dimensional virtual object of FIG. 2A scaled to fit within a field of view of the head-mounted display device.

Some three-dimensional virtual objects may include dimensional information, e.g. metadata regarding dimensions at which the three-dimensional virtual object is to be displayed relative to the real-world environment. The dimensional information may specify any suitable scale characteristics (e.g. dimension(s), volume(s), aspect ratio(s), scale(s), orientation(s), position(s), etc.), and may take any suitable form. For example, the dimensional information may include units specifying dimensions of the three-dimensional virtual object, or may comprise unitless values that are given units by a computer program used to display/view the three-dimensional virtual object. The dimensional information may be obtained from metadata for the three-dimensional virtual object, a data table, a database, or any other suitable location.

Where a three-dimensional virtual object is too large to fit entirely within the HMD field of view 106 due to its scale exceeding the HMD field of view 106, the HMD 104 may modify the three-dimensional virtual object to fully fit within the HMD field of view 106 so that a user may view the three-dimensional virtual object in its entirety. FIGS. 2A-2B illustrate the modification of an example three-dimensional virtual object 200 to fit within the HMD field of view 106. In one example, referring to FIG. 2A, the HMD 104 obtains the three-dimensional virtual object 200, for example from local or remote storage, and compares the dimensional information of the three-dimensional virtual object 200 to dimensional information for the HMD field of view 106. In the depicted example, a bounding box defined around the three-dimensional virtual object 200 is determined based upon the dimensional information (e.g. as a maximum dimension of the three-dimensional virtual object in each coordinate direction), as schematically indicated by bounding box 202. The bounding box 202 is shown as a rectangular three-dimensional boundary surrounding and fully containing the three-dimensional virtual object 202, although any other suitably shaped bounding volume may be utilized. The bounding box 202 may represent dimensions relative to the viewing direction in which the three-dimensional virtual object 200 is to be initially rendered, or may represent a largest dimension from any viewing angle. The HMD 104 then may compare an aspect ratio of the bounding box 202 to an aspect ratio of the HMD field of view 106, and based on the comparison, modify the three-dimensional virtual object 200, e.g. by scaling the three-dimensional virtual object 200 to obtain a modified three-dimensional virtual object 204, to fit within the HMD field of view 106, as depicted in FIG. 2B. In some examples, dimensions of the three-dimensional virtual object 200 may be resized while still keeping the same aspect ratio(s). In other examples, the aspect ratio of the three-dimensional virtual object 200 may be changed, such as by stretching, pinching, or flattening.

The relative aspect ratios of the three-dimensional virtual object 200 and the HMD field of view 106 may vary depending upon an apparent distance from the HMD 104 at which the three-dimensional virtual object 200 is to appear when displayed. Thus, in some examples, the HMD 104 may be configured to position the three-dimensional virtual object 200 at a preselected virtual distance from the HMD 104 for comparing the dimensional information of the three-dimensional virtual object 200 and the HMD field of view 106. In the example of FIG. 2B, a nearest location on the bounding box 202 relative to the HMD 104 is positioned at the preselected virtual distance. The nearest location may be a nearest location in a selected orientation (e.g. a "front" of the three-dimensional virtual object 200, where the term "front" represents a direction from which the three-dimensional virtual object 200 is initially viewed or intended to be viewed), or may be a nearest location from any perspective of the three-dimensional virtual object 200 from which it may be viewed. In further examples, any other suitable reference location on the three-dimensional virtual object 200 may be utilized. In yet other examples, the three-dimensional virtual object 200 may be positioned by user input moving and placing the three-dimensional virtual object 200 at a virtual distance from the HMD 104.

As mentioned above, the aspect ratio of the three-dimensional virtual object 200 that is used for the comparison may represent the aspect ratio from a particular perspective (e.g. a front perspective), or a combination of the largest dimension in each coordinate direction. Thus, in some examples the three-dimensional virtual object 200 may be rotated and compared to the HMD field of view 106 at a plurality of different viewing angles to determine a largest dimension in each coordinate direction. This may be performed for a single axis (e.g. a direction of gravity), or along each coordinate axis. The HMD 104 may then modify the three-dimensional virtual object 200 based upon a largest dimension in each coordinate direction to obtain the modified three-dimensional virtual object 204.

Other suitable methods of modifying the three-dimensional virtual object 200 to fit within the HMD field of view 106 may be utilized. As another example, an apparent distance of the displayed three-dimensional virtual object 200 from the user 102 may be varied while keeping the dimensions fixed until the three-dimensional virtual object 200 fits within the HMD field of view 106. In this sense, the scale is changed by changing the apparent distance from the user at which the virtual object 200 is displayed. Yet another example includes scaling and/or resizing the three-dimensional virtual object 200 to a predetermined scale/size and displaying at a predetermined distance from the user 102. In other examples, other suitable references points (e.g. a center point) of the three-dimensional virtual object 200 may be utilized for positioning the three-dimensional virtual object 200. Further, the user 102 may modify a scale/size of the three-dimensional virtual object 200 via user input(s).

Figure 3:
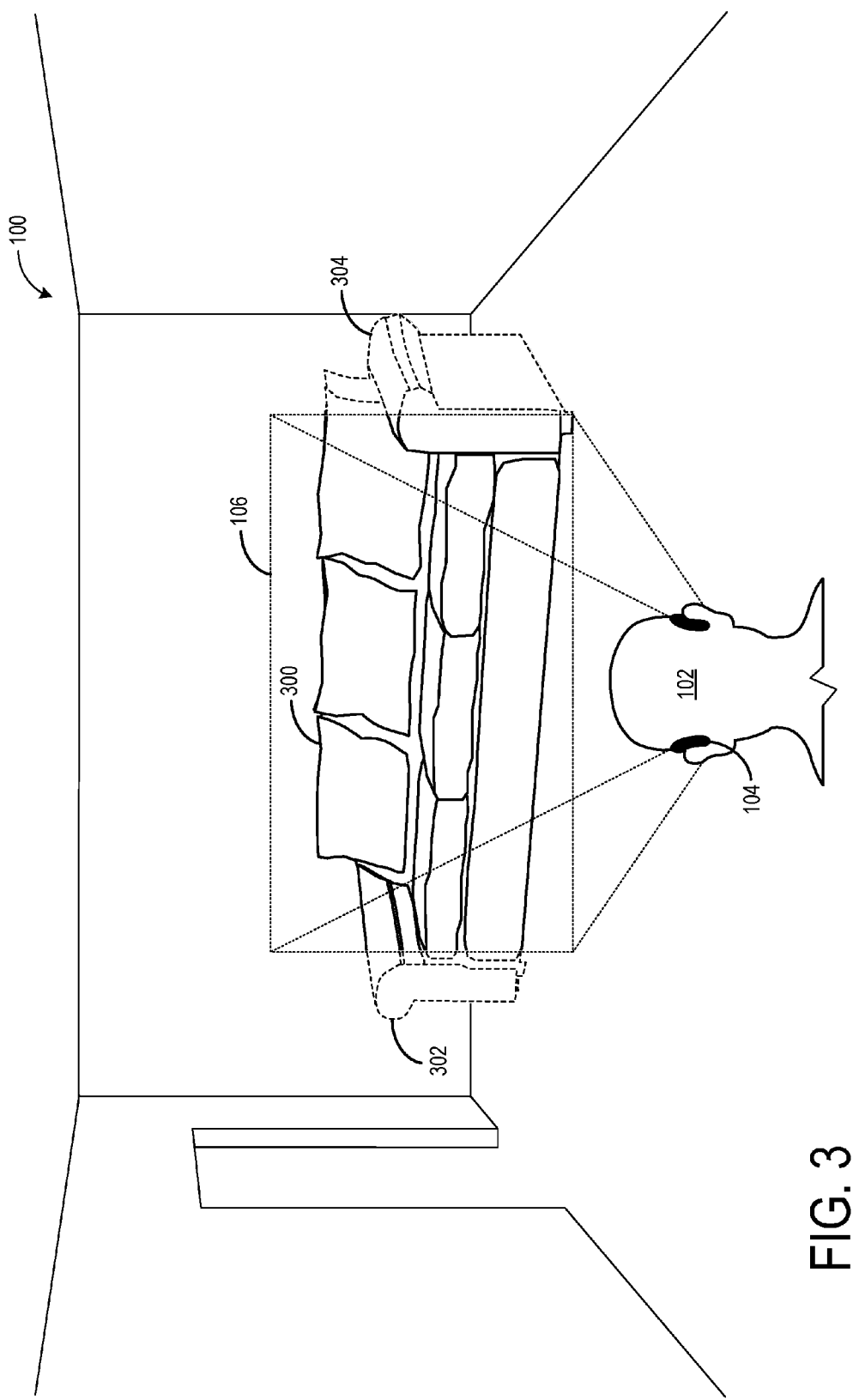
FIG. 3 shows an example three-dimensional virtual object being displayed without being modified compared to a field of view of the head-mounted display device.

In some instances, it may be desired not to modify a three-dimensional virtual object for display, such as where it is desired to display a three-dimensional virtual object in a true-to-size scale relative to the real world. As such, dimensional information provided to the HMD 104 may further specify whether a three-dimensional virtual object is not to be modified for display, e.g. to remain true-to-size. Such information may take the form of metadata (e.g. a flag) that is included in the three-dimensional virtual object data file, a user-controllable setting, or any other suitable form. The flag may be set at development time by an author of the model, or may be a user-adjustable parameter. As an example, a three-dimensional virtual object representing a piece of furniture may be displayed true-to-size with respect to the real world environment 100, rather than modified to fit in the HMD field of view 106. Accordingly, FIG. 3 shows an example three-dimensional virtual object 300 in the form of a couch being displayed at a true-to-size dimensional scale relative to the real world environment 100 without modification. In this view, some portions of the three-dimensional virtual object 300 may not be viewable in the HMD field of view 106, as represented by dotted-line portions 302 and 304. However, the portions 302 and 304 of the three-dimensional virtual object 300 may be become visible as the user 102 moves his or her head and/or position within the environment 100.

Figure 4:
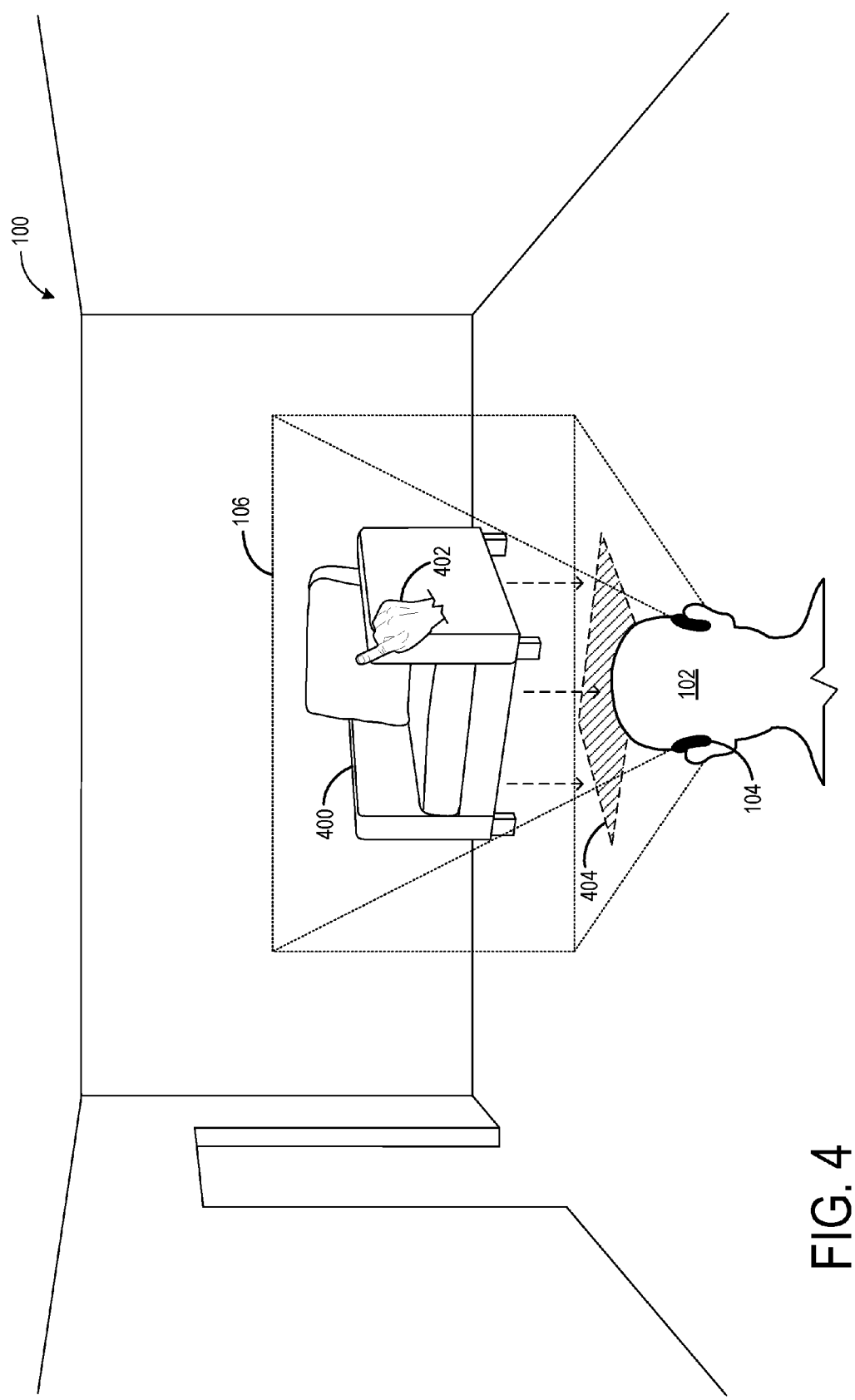
FIG. 4 shows an example scenario in which a three-dimensional virtual object may be snapped to a real surface, and illustrates visual feedback displayed in response to the three-dimensional virtual object approaching the real surface.

In some examples, a user may manipulate or otherwise interact with three-dimensional virtual objects that are displayed. FIG. 4 shows an example of a user 102 interacting with a three-dimensional virtual object 400 using a hand gesture 402. A user may interact with a three-dimensional virtual object via any suitable user input mode, including but not limited to speech, gesture, touch, and eye gaze.

As the user 102 moves the three-dimensional virtual object 400, the three-dimensional virtual object 400 may be displayed such that it appears to "snap to" a surface within the environment 100. As such, the HMD 104 may be configured to detect one or more surfaces in the environment 100 via image data acquired from outward-facing camera(s). Non-limiting examples of methods to detect geometric planes in the three-dimensional representation include the use of algorithms such as linear least squares or random sample consensus (RANSAC) algorithms.

In the example of FIG. 4, as a user input moves a position of the three-dimensional virtual object 400, the HMD 104 may detect the three-dimensional virtual object 400 being moved to within a threshold distance of a surface of the floor in the environment 100. In response, the HMD 104 may be configured to display visual feedback 404 indicating that the three-dimensional virtual object 400 can be made to "snap to" the floor surface (e.g. be displayed as in contact with the surface and having movement of the three-dimensional virtual object 400 constrained to be along the surface). The visual feedback 404 may be displayed as a change in the appearance of the floor surface that is proximate to the position of the three-dimensional virtual object 404, e.g. to indicate a corresponding location on the floor to which the three-dimensional virtual object 400 may "snap." The visual feedback 404 may have any suitable appearance, including but not limited to display of a color (e.g. highlight), texture, pattern (e.g. a grid), outline, or shading of the floor. In some examples, additional visual feedback may be displayed other than a change in appearance of the floor, such as one or more arrows pointing from the three-dimensional virtual object 400 toward the floor (as shown), a text instruction, or any other suitable visual feedback. In other examples, audio and/or haptic feedback may also be provided in response to detecting that the three-dimensional virtual object 400 is being moved to within the threshold distance of the floor.

The HMD 104 may be configured to cease display of the visual feedback 404 as the user moves the three-dimensional virtual object 400 away from the floor or other surface. On the other hand, when the three-dimensional virtual object 400 is released within the threshold distance (or upon any other suitable user input), the HMD 104 may automatically reposition the three-dimensional virtual object 400 so that it is in apparent contact with the floor. This automatic repositioning may take the form of an animated movement to illustrate the snap effect. Further, subsequent movement of the three-dimensional virtual object 400 via user input may be constrained to being along the floor. The HMD 104 may further apply collision and/or occlusion logic to display the three-dimensional virtual object 400 with regard to other virtual objects and/or real objects as the user moves the three-dimensional virtual object 400 along the floor.

In some examples, the HMD 104 may automatically determine a position within the environment in which to display the three-dimensional virtual object 400. For example, the HMD 104 may select as a display position a surface having a size and/or shape that can fit the three-dimensional virtual object, an unoccupied surface as opposed to a cluttered surface, and/or a surface type that is compatible with a virtual object type or characteristic (e.g. a wall for display of a virtual poster). It will be understood that a three-dimensional virtual object may appear to "snap to" and be constrained to move along any other suitable surface and/or feature of the environment than the floor.

Figure 5A:
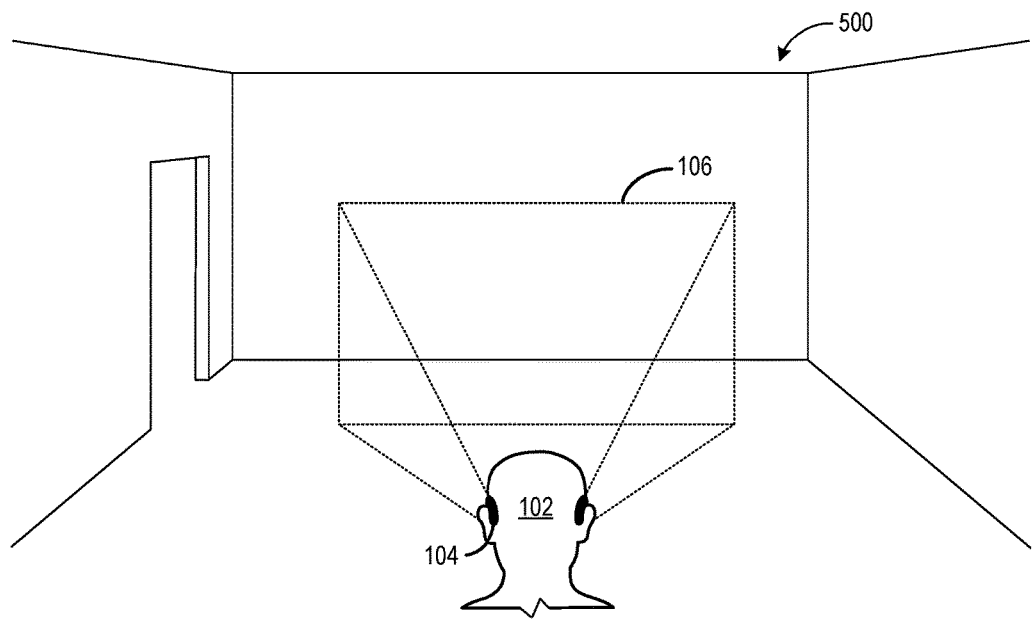
FIGS. 5A-5D show an example scenario in which a head-mounted display device displays a graphical user interface in response to detecting the presence of a physical hand in image data.
Figure 5B:
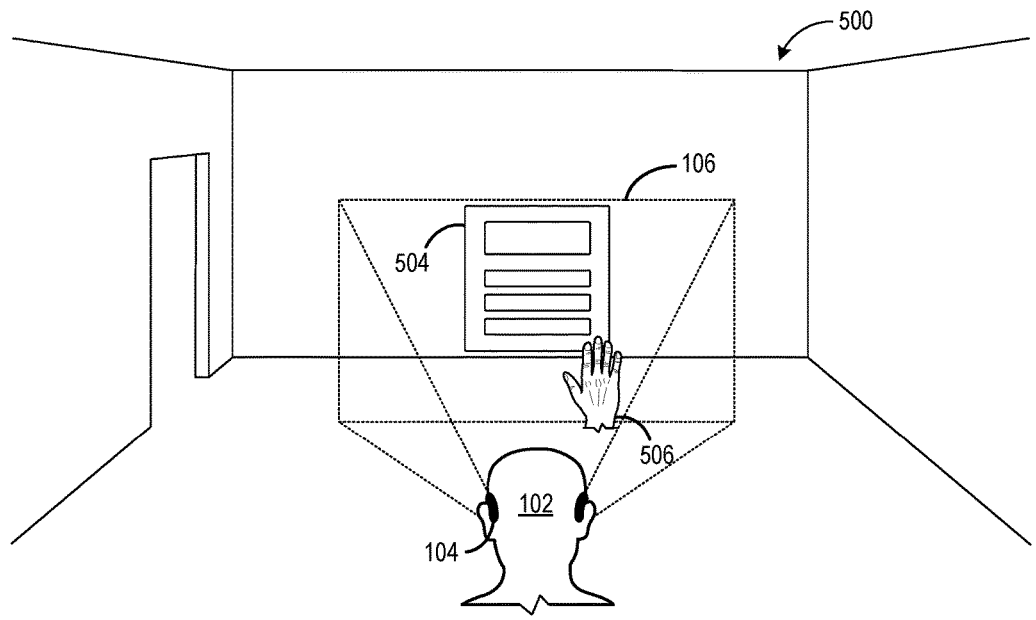

FIG. 5A shows another example use environment 500 for the HMD 104, and FIG. 5B shows a virtual menu 504 being displayed in response to detecting a hand 506 of the user 102 in image data acquired by an outward-facing camera of the HMD 104. The HMD 104 may recognize the hand 506 using any suitable object recognition and/or classification methods. The menu 504 may be displayed as world-locked (e.g. stationary with respect to the background real-world view), device-locked (e.g. stays positionally fixed relative to the HMD field of view 106), or in any other suitable manner. The menu 504 may include any suitable user selectable elements and/or administrative controls, such as controls to manipulate the display of three-dimensional virtual objects, browse files, edit three-dimensional virtual objects, modify metadata associated with three-dimensional virtual objects, etc.

Figure 5C:
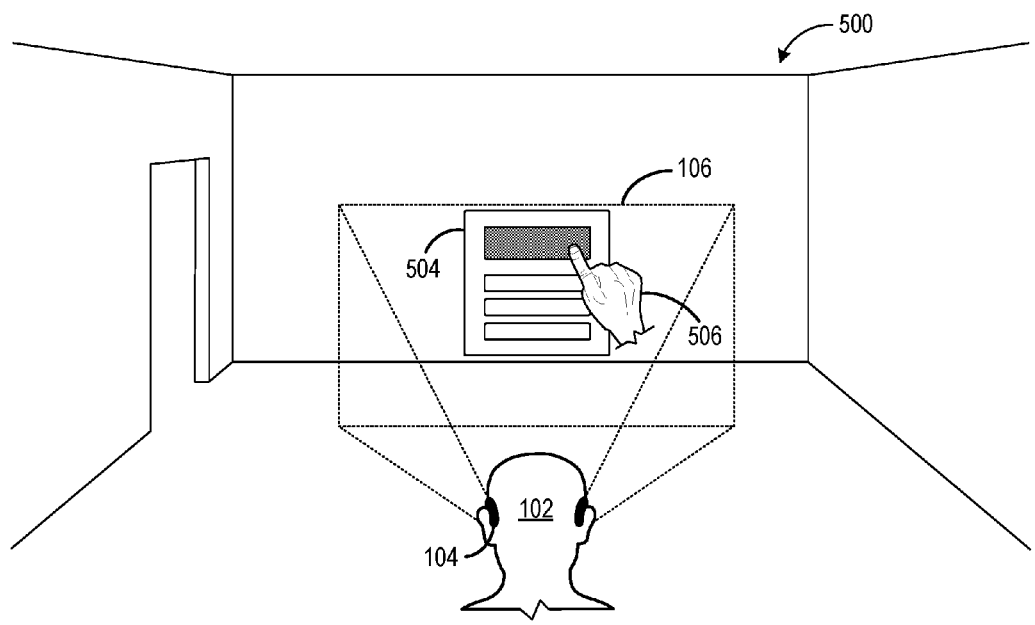
Figure 5D:
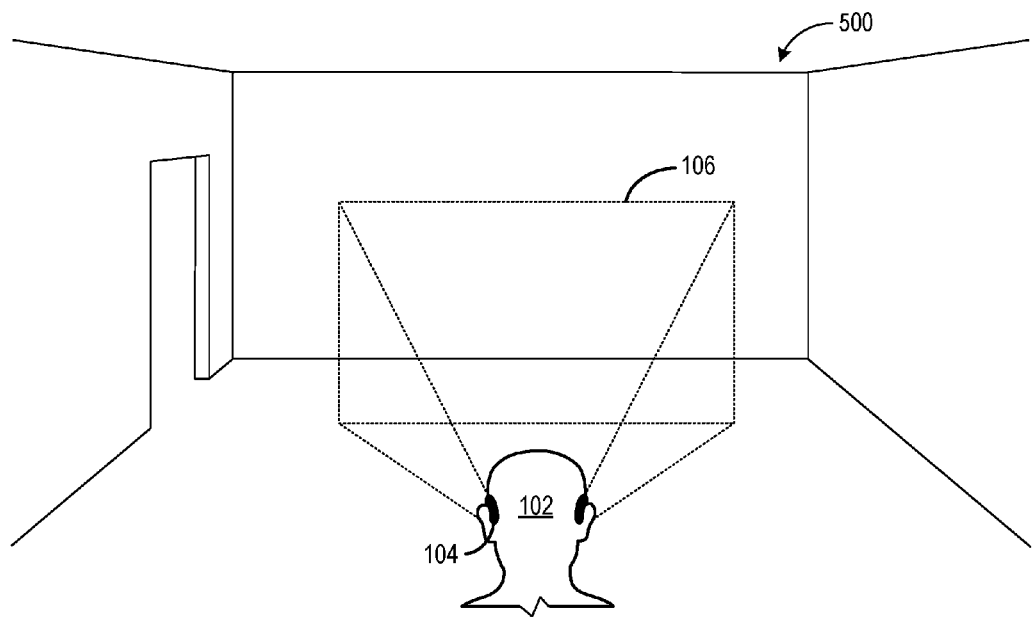

FIG. 5C shows the user 102 making a user input by selecting a user interface element on the displayed menu 504 using the hand 506. The HMD 104 may detect the user input via gesture recognition techniques. Next referring to FIG. 5D, when the presence of the hand 506 is no longer detected, display of the menu 504 is automatically ceased. Thus, automatically displaying or hiding a user interface based upon the detected presence or absence of a user's hand may provide the user 102 with a convenient user interface. In other examples, any other suitable user input may be used to trigger the display of a user interface. Further, the triggering user input may be a selectable setting.

FIGS. 6A-6B illustrate an example method 600, enacted on a display device, of displaying three-dimensional virtual objects with respect to a field of view of the display device. The method 600 includes, at 602, acquiring image data imaging an environment via a camera. Any suitable camera may be used, including but not limited to one or more two-dimensional cameras and/or depth cameras. At 604, the method 600 includes receiving a user input requesting display of a first three-dimensional virtual object. The method 600 further includes, at 606, comparing dimensional information for the first three-dimensional virtual object to dimensional information regarding a field of view of the display device. The dimensional information for the three-dimensional virtual object may be included as metadata with the three-dimensional object file, data from a data table or a database, or may be obtained in any other suitable manner.

The display device may compare the dimensional information in any suitable manner, examples of which are described above with regard to FIG. 2. For example, comparing the dimensional information may include, at 608, comparing an aspect ratio of a bounding box defined around the first three-dimensional virtual object to an aspect ratio of the field of view. This comparison may also include, at 610, positioning the first three-dimensional virtual object at a preselected virtual distance from the display device and comparing dimensional information based upon the preselected virtual distance. This may include positioning a nearest location of the first three-dimensional virtual object at the preselected virtual distance from the display device, as shown at 612, or positioning another reference location at the preselected virtual distance. Comparing dimensional information may also include, at 614, receiving a user input positioning the first three-dimensional virtual object at a virtual distance from the display device and comparing based upon the virtual distance. Comparing dimensional information may further include, at 616, rotating the first three-dimensional virtual object around an axis and comparing aspect ratios at multiple axial positions.

Continuing with FIG. 6B, the method 600 includes, at 618, modifying the first three-dimensional virtual object based upon the comparison of dimensional information to obtain a modified version of the first three-dimensional virtual object. In examples where comparing dimensional information includes rotating the first three-dimensional virtual object, the method 600 includes modifying the first three-dimensional virtual object based upon a greatest aspect ratio of the aspect ratios at the multiple axial positions, at 620. The method 600 further includes, at 622, displaying the modified first three-dimensional virtual object via a display of the display device.

Continuing, the method 600 further may include, at 624, receiving a user input requesting display of a second three-dimensional virtual object, and at 626, determining that the second three-dimensional virtual object is not to be modified compared to the field of view of the display device. This may be determined, for example, by checking a status of a flag associated with the second three-dimensional virtual object, at 628, by receiving a user input requesting the second three-dimensional virtual object to not be modified, at 630, or in any other suitable manner. The method 600 then includes, at 632, displaying the second three-dimensional virtual object without modifying the second three-dimensional virtual object. As described above, this may allow selected three-dimensional virtual objects to appear within the environment true-to-size. In some examples, such a flag also may indicate not to allow the second three-dimensional virtual model to be moved or rotated.

FIG. 7 illustrates an example method 700, enacted on a display device, of displaying a three-dimensional virtual object to be constrained to appear as being positioned on a surface. The method 700 includes, at 702, acquiring image data imaging an environment via a camera, and at 704, detecting a surface within the environment. As described above, any suitable surface identification methods may be used. Method 700 further comprises, at 706, receiving a user input requesting display of a three-dimensional virtual object, and in response displaying the three-dimensional virtual object via a display, at 708. At 710, method 700 comprises receiving a user input moving a position of the three-dimensional virtual object, and at 712, detecting the three-dimensional virtual object as being positioned within a threshold distance of the surface in the environment. The method 700 further includes, at 714, displaying visual feedback related to a distance of the three-dimensional virtual object from the surface, which may include, at 716, displaying a change in appearance of the surface proximate to the position of the three-dimensional virtual object. Next, the method 700 includes, at 718, detecting that the user input moving the three-dimensional virtual object is completed within the threshold distance of the surface, and in response displaying the three-dimensional virtual object to appear as being positioned on the surface, at 720. Further movement of the object may be constrained to being along the surface, as indicated at 722, until the constraint is removed (e.g. by a user turning off a "snap-to" mode setting, or by any other suitable event or input).

Figure 8:
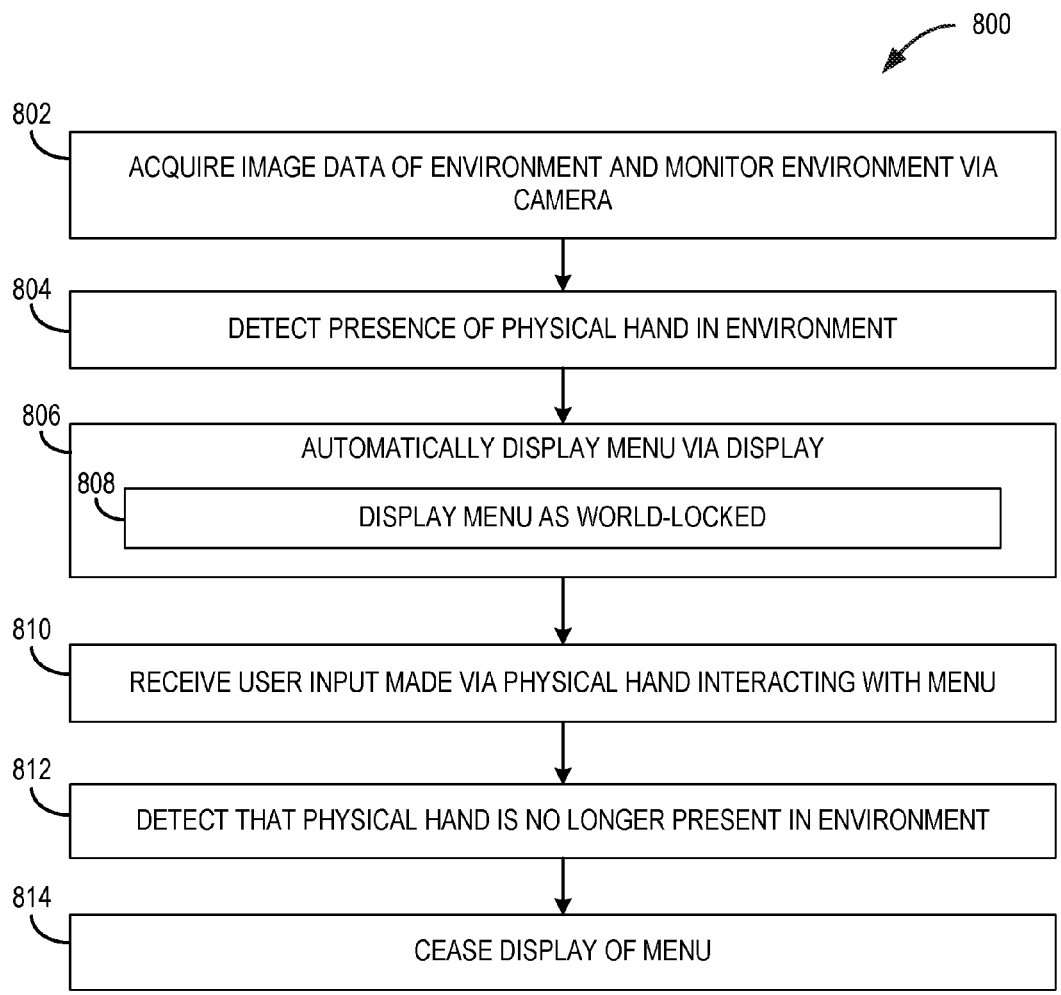
FIG. 8 shows a flow diagram illustrating an example method of displaying a menu in response to detecting the presence of a physical hand.

FIG. 8 illustrates an example method 800, enacted on a display device, of displaying a menu in response to detecting the presence of a physical hand. The method 800 includes acquiring via a camera image data of an environment and monitoring the environment via the image data, at 802. The method 800 further comprises detecting the presence of a physical hand in the environment, at 804, and in response, at 806, automatically displaying a menu via a display of the display device. The menu may be displayed as world-locked, at 808, device-locked, or in any other suitable manner. The method 800 further includes, at 810, receiving a user input made via the physical hand interacting with the menu, at 812, detecting that the physical hand is no longer present in the environment, and at 814, ceasing display of the menu in response to no longer detecting the hand.

Figure 9:
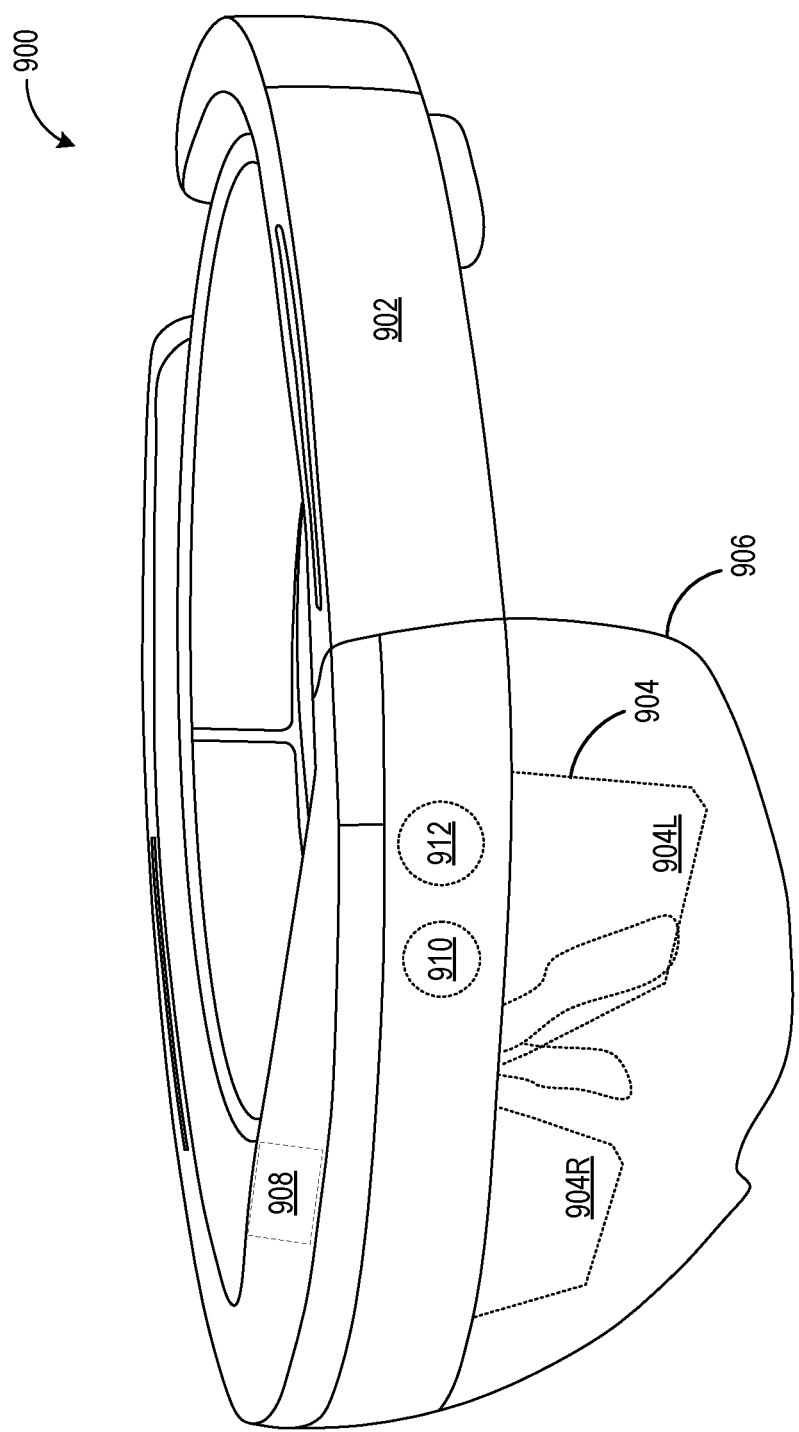
FIG. 9 shows an example head-mounted display device.

FIG. 9 schematically illustrates an example head-mounted display device 900. The head-mounted display device 900 includes a frame 902 in the form of a band wearable around a head of user that supports see-through display componentry positioned nearby the user's eyes. As mentioned above, the head-mounted display device 900 may utilize augmented reality technologies to enable simultaneous viewing of virtual display imagery and a real world background. As such, the head-mounted display device 900 may generate virtual images via see-through display 904, which includes separate right and left eye displays 904R and 904L, and which may be wholly or partially transparent. The see-through display 904 may take any suitable form, such as a waveguide or prism configured to receive a generated image and direct the image towards a wearer's eye. The see-through display 904 may include a backlight and a microdisplay, such as liquid-crystal display (LCD) or liquid crystal on silicon (LCOS) display, in combination with one or more light-emitting diodes (LEDs), laser diodes, and/or other light sources. In other examples, the see-through display 904 may utilize quantum-dot display technologies, active-matrix organic LED (OLED) technology, and/or any other suitable display technologies. It will be understood that while shown in FIG. 9 as a flat display surface with left and right eye displays, the see-through display 904 may be a single display, may be curved, or may take any other suitable form.

The head-mounted display device 900 further includes an additional see-through optical component 906, shown in FIG. 9 in the form of a see-through veil positioned between the see-through display 904 and the real world environment as viewed by a wearer. A controller 908 is operatively coupled to the see-through optical component 904 and to other display componentry. The controller 908 includes one or more logic devices and one or more computer memory devices storing instructions executable by the logic device(s) to enact functionalities of the head-mounted display device 900. The head-mounted display device 900 may further include various other components, for example a two-dimensional image camera 910 (e.g. a visible light camera and/or infrared camera) and a depth camera 912, as well as other components that are not shown, including but not limited to speakers, microphones, accelerometers, gyroscopes, magnetometers, temperature sensors, touch sensors, biometric sensors, other image sensors, eye-gaze detection systems, energy-storage components (e.g. battery), a communication facility, a GPS receiver, etc.

Figure 10:
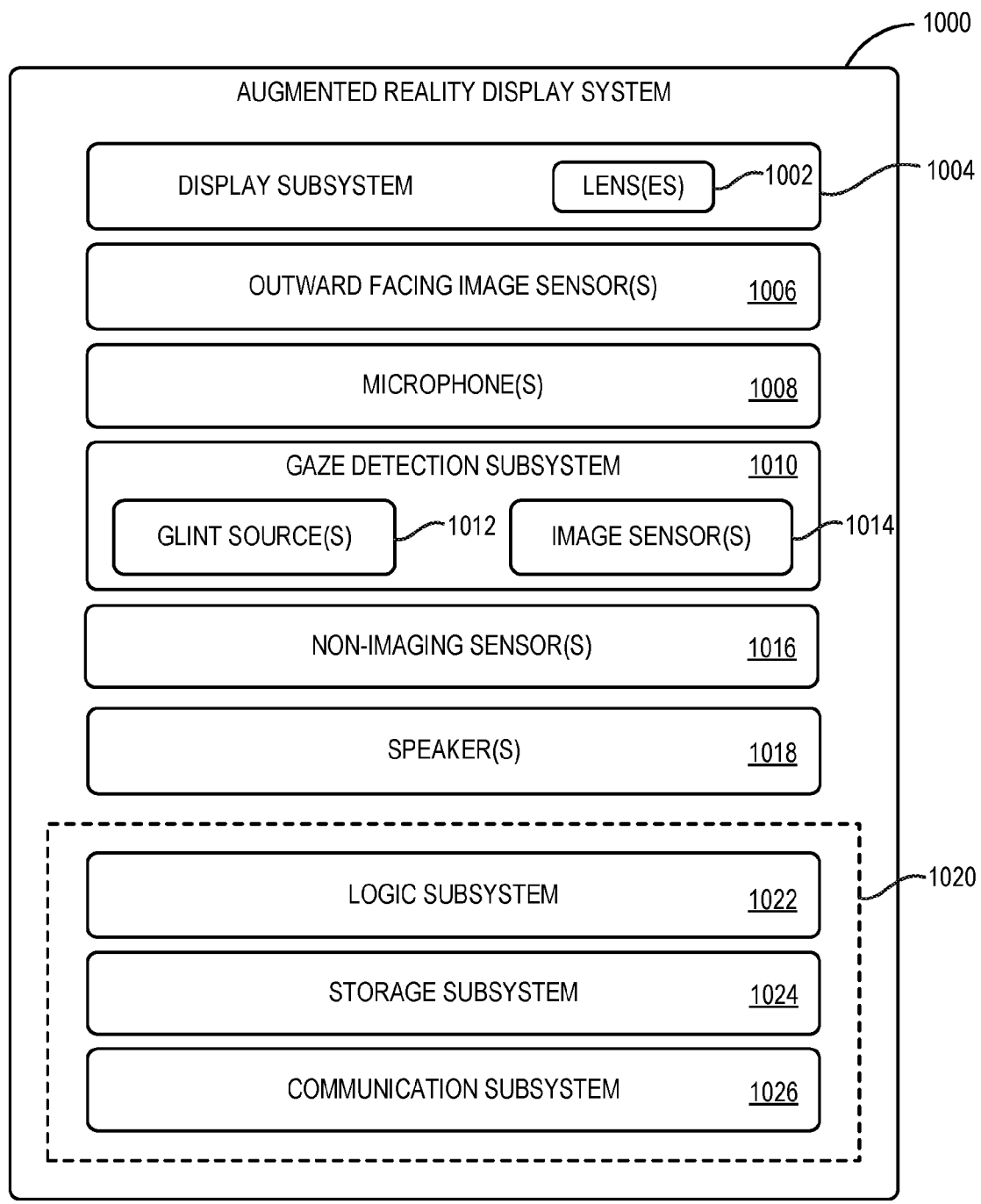
FIG. 10 shows a block diagram of an example augmented reality display system.

FIG. 10 shows a block diagram of an example augmented reality display system 1000. The display system 1000 includes one or more lenses 1002 that form a part of a display subsystem 1004, e.g. a see-through display subsystem, such that images may be displayed via the lenses 1002 (e.g. via projection onto the lenses 1002, waveguide system(s) incorporated into the lenses 1002, and/or in any other suitable manner). The augmented reality display system 1000 further includes one or more outward-facing image sensors 1006 configured to acquire images of a real-world environment being viewed by a user, and may include one or more microphones 1008 configured to detect sounds, such as voice commands from a user or ambient sounds. The outward-facing image sensors 1006 may include one or more depth sensor(s) and/or one or more two-dimensional image sensor(s) (e.g. RGB image sensors).

The augmented reality display system 1000 may further include a gaze detection subsystem 1010 configured to detect a gaze of a user for detecting user input interacting with displayed virtual lists and objects, for example when the augmented reality display system 1000 is implemented as a head-mounted display system, as mentioned above. The gaze detection subsystem 1010 may be configured to determine gaze directions of each of a user's eyes in any suitable manner. In this example, the gaze detection subsystem 1010 comprises one or more glint sources 1012, such as infrared light sources configured to cause a glint of light to reflect from each eyeball of a user, and one or more image sensor(s) 1014, such as inward-facing sensors, configured to capture an image of each eyeball of the user. Changes in glints from the user's eyeballs and/or a location of a user's pupil as determined from image data gathered via the image sensor(s) 1014 may be used to determine a direction in which to project gaze lines from the user's eyes. Further, a location at which gaze lines projected from the user's eyes intersect the environment may be used to determine an object at which the user is gazing (e.g. a displayed virtual object and/or real background object). The gaze detection subsystem 1010 may have any suitable number and arrangement of light sources and image sensors. In other examples, the gaze detection subsystem 1010 may be omitted.

The augmented reality display system 1000 also may include additional sensors. For example, the augmented reality display system 1000 may include non-imaging sensor(s) 1016, examples of which may include but are not limited to an accelerometer, a gyroscopic sensor, a global positioning system (GPS) sensor, and an inertial measurement unit (IMU). Such sensor(s) may help to determine the position, location, and/or orientation of the augmented reality display system 1000 within the environment, which may help provide accurate 3D mapping of the real-world environment for use in displaying three-dimensional virtual objects appropriately in an augmented reality setting.

Motion sensors, as well as the microphone(s) 1008 and the gaze detection subsystem 1010, also may be employed as user input devices, such that a user may interact with the augmented reality display system 1000 via gestures of the eye, neck and/or head, as well as via verbal commands. It will be understood that sensors illustrated in FIG. 10 are shown for the purpose of example and are not intended to be limiting in any manner, as any other suitable sensors and/or combination of sensors may be utilized.

The augmented reality display system 1000 further includes one or more speaker(s) 1018, for example to provide audio outputs to a user for user interactions. The augmented reality display system 1000 further includes a controller 1020 having a logic subsystem 1022 and a storage subsystem 1024 in communication with the sensors, the gaze detection subsystem 1010, the display subsystem 1004, and/or other components. The storage subsystem 1024 comprises instructions stored thereon that are executable by the logic subsystem 1022, for example, to receive and interpret inputs from the sensors, to identify location and movements of a user, to identify real objects in an augmented reality field of view and present augmented reality imagery therefore, to detect objects located outside a field of view of the user, and to present indications of positional information associated with objects located outside the field of view of the user, among other tasks.

The logic subsystem 1022 includes one or more physical devices configured to execute instructions. For example, the logic subsystem 1022 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1022 may include one or more processors configured to execute software instructions. Additionally or alternatively, the logic subsystem 1022 may include one or more hardware or firmware logic subsystems configured to execute hardware or firmware instructions. Processors of the logic subsystem 1022 may be single-core or multi-core, and the instructions executed thereon may be configured for sequential, parallel, and/or distributed processing. Individual components of the logic subsystem 1022 optionally may be distributed among two or more separate devices, which may be remotely located and/or configured for coordinated processing. Aspects of the logic subsystem 1022 may be virtualized and executed by remotely accessible, networked computing devices configured in a cloud-computing configuration.

The storage subsystem 1024 includes one or more physical devices configured to hold instructions executable by the logic subsystem 1022 to implement the methods and processes described herein. When such methods and processes are implemented, the state of the storage subsystem 1024 may be transformed—e.g., to hold different data.

The storage subsystem 1024 may include removable and/or built-in devices. The storage subsystem 1024 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem 1024 may include volatile, nonvolatile, dynamic, static, read/write, read-only, random-access, sequential-access, location-addressable, file-addressable, and/or content-addressable devices.

It will be appreciated that the storage subsystem 1024 includes one or more physical devices. However, aspects of the instructions described herein alternatively may be propagated by a communication medium (e.g., an electromagnetic signal, an optical signal, etc.), as opposed to being stored on a storage device.

Aspects of the logic subsystem 1022 and the storage subsystem 1024 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The display subsystem 1004 may be used to present a visual representation of data held by the storage subsystem 1024. This visual representation may take the form of three-dimensional virtual objects, a graphical user interface (GUI) comprising a menu and/or other graphical user interface elements. As the herein described methods and processes change the data held by the storage subsystem 1024, and thus transform the state of the storage subsystem, the state of see-through display subsystem 1004 may likewise be transformed to visually represent changes in the underlying data. The display subsystem 1004 may include one or more display devices utilizing virtually any type of technology. Such display devices may be combined with the logic subsystem 1022 and/or the storage subsystem 1024 in a shared enclosure, or such display devices may be peripheral display devices.

The communication subsystem 1026 may be configured to communicatively couple the augmented reality display system 1000 with one or more other computing devices. The communication subsystem 1026 may include wired and/or wireless communication devices compatible with one or more different communication protocols. As non-limiting examples, the communication subsystem 1026 may be configured for communication via a wireless telephone network, or a wired or wireless local- or wide-area network. In some embodiments, the communication subsystem 1026 may allow the augmented reality display system 1000 to send and/or receive data to and/or from other devices via a network such as the Internet.

It will be appreciated that the depicted augmented reality display system 1000 is described for the purpose of example, and is not meant to be limiting. It is to be further understood that the augmented reality display system 1000 may include additional and/or alternative sensors, cameras, microphones, input devices, output devices, etc. than those shown without departing from the scope of this disclosure. For example, the display system 1000 may be implemented as a virtual reality display system rather than an augmented reality system. Additionally, the physical configuration of a display device and its various sensors and subcomponents may take a variety of different forms without departing from the scope of this disclosure. Further, it will be understood that the methods and processes described herein may be implemented as a computer-application program or service, an application-programming interface (API), a library, and/or other computer program product. Such computer program products may be executable locally on the augmented reality display system 1000 or other suitable display system, or may be executable remotely on a computing system in communication with the augmented reality display system 1000.

Another example provides, on a display device comprising a camera and a display, a method comprising acquiring, via the camera, image data imaging an environment, receiving a user input requesting display of a three-dimensional virtual object, comparing dimensional information for the three-dimensional virtual object to dimensional information for a field of view of the display device, modifying the three-dimensional virtual object based upon comparing the dimensional information for the three-dimensional virtual object to the dimensional information for the field of view to obtain a modified three-dimensional virtual object, and displaying the modified three-dimensional virtual object via the display. Where the three-dimensional virtual object is a first three-dimensional virtual object, the method may additionally or alternatively include receiving a user input requesting display of a second three-dimensional virtual object, determining that the second three-dimensional virtual object is not to be modified and displaying the second three-dimensional virtual object without modifying the second three-dimensional virtual object. Determining that the second three-dimensional virtual object is not to be modified may additionally or alternatively include checking a status of a flag associated with the second three-dimensional virtual object. Determining that the second three-dimensional virtual object is not to be modified may additionally or alternatively include receiving a user input requesting the second three-dimensional virtual object to not be modified. The method may additionally or alternatively include not permitting the second three-dimensional virtual model to be moved or rotated based upon determining that the second three-dimensional virtual object is not to be modified. Comparing the dimensional information for the three-dimensional virtual object to the dimensional information for the field of view may additionally or alternatively include comparing an aspect ratio of a bounding box defined around the three-dimensional virtual object to an aspect ratio of the field of view. Comparing the dimensional information for the three-dimensional virtual object to the dimensional information for the field of view may additionally or alternatively include positioning the three-dimensional virtual object at a preselected virtual distance from the display device and comparing based upon the preselected virtual distance. Positioning the three-dimensional virtual object may additionally or alternatively include positioning a nearest location of the three-dimensional virtual object at the preselected virtual distance from the display device. Comparing the dimensional information for the three-dimensional virtual object to the dimensional information for the field of view further may additionally or alternatively include receiving a user input positioning the three-dimensional virtual object at a virtual distance from the display device, and comparing based upon the virtual distance. Comparing the dimensional information for the three-dimensional virtual object to the dimensional information for the field of view may additionally or alternatively include rotating the three-dimensional virtual object around an axis and comparing aspect ratios at multiple axial positions, and wherein modifying further comprises modifying the three-dimensional virtual object based upon a greatest aspect ratio of the aspect ratios at the multiple axial positions. The method may additionally or alternatively include obtaining the dimensional information from metadata for the three-dimensional virtual object. The method may additionally or alternatively include obtaining the dimensional information from one or more of a data table and a database.

Another example provides a display device, comprising a camera, a display, a logic subsystem, and a storage subsystem comprising instructions that are executable by the logic subsystem to acquire image data imaging an environment via the camera, from the image data, detect a surface within the environment, receive a user input requesting display of a three-dimensional virtual object, display the three-dimensional virtual object via the display, receive a user input moving a position of the three-dimensional virtual object, detect the three-dimensional virtual object being moved to within a threshold distance of the surface, display the three-dimensional virtual object to appear as being positioned on the surface, and constrain movement of the three-dimensional virtual object to being along the surface. The instructions may be additionally or alternatively executable to display the three-dimensional virtual object to appear as being positioned on the surface when a user input moving the three-dimensional virtual object is completed within the threshold distance of the surface. The instructions may be additionally or alternatively executable to, prior to displaying the three-dimensional object to appear as being positioned on the surface, display visual feedback related to a distance of the three-dimensional virtual object from the surface. The instructions may be additionally or alternatively executable to display the visual feedback by displaying a change in an appearance of the surface proximate to a position of the three-dimensional virtual object.

Another example provides a display device comprising a depth camera, a display, a logic subsystem, and a storage subsystem comprising instructions that are executable by the logic subsystem to acquire image data of an environment and monitor the environment via the camera, detect the presence of a physical hand in the environment, and in response, automatically display a menu via the display. The instructions may be additionally or alternatively executable to detect that the physical hand is no longer present in the environment, and cease display of the menu. The instructions may be additionally or alternatively executable to display the menu as world-locked. The instructions may be additionally or alternatively executable to receive a user input made via the physical hand interacting with the menu.

The configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a display device comprising a camera and a display, a method comprising:
   acquiring, via the camera, image data imaging an environment;
   receiving a user input requesting display of a three-dimensional virtual object;
   comparing dimensional information for the three-dimensional virtual object to dimensional information for a field of view of the display device by rotating the three-dimensional virtual object around an axis and comparing aspect ratios at multiple axial positions;
   modifying the three-dimensional virtual object based upon comparing the dimensional information for the three-dimensional virtual object to the dimensional information for the field of view to obtain a modified three-dimensional virtual object; and
   displaying the modified three-dimensional virtual object via the display.

2. The method of claim 1, wherein the three-dimensional virtual object is a first three-dimensional virtual object, and further comprising receiving a user input requesting display of a second three-dimensional virtual object, determining that the second three-dimensional virtual object is not to be modified and displaying the second three-dimensional virtual object without modifying the second three-dimensional virtual object.

3. The method of claim 2, wherein determining that the second three-dimensional virtual object is not to be modified comprises checking a status of a flag associated with the second three-dimensional virtual object.

4. The method of claim 2, wherein determining that the second three-dimensional virtual object is not to be modified comprises receiving a user input requesting the second three-dimensional virtual object to not be modified.

5. The method of claim 2, further comprising not permitting the second three-dimensional virtual model to be moved or rotated based upon determining that the second three-dimensional virtual object is not to be modified.

6. The method of claim 1, wherein comparing the dimensional information for the three-dimensional virtual object to the dimensional information for the field of view comprises comparing an aspect ratio of a bounding box defined around the three-dimensional virtual object to an aspect ratio of the field of view.

7. The method of claim 1, wherein comparing the dimensional information for the three-dimensional virtual object to the dimensional information for the field of view further comprises positioning the three-dimensional virtual object at a preselected virtual distance from the display device and comparing based upon the preselected virtual distance.

8. The method of claim 7, wherein positioning the three-dimensional virtual object comprises positioning a nearest location of the three-dimensional virtual object at the preselected virtual distance from the display device.

9. The method of claim 1, wherein comparing the dimensional information for the three-dimensional virtual object to the dimensional information for the field of view further comprises receiving a user input positioning the three-dimensional virtual object at a virtual distance from the display device, and comparing based upon the virtual distance.

10. The method of claim 1, wherein modifying further comprises modifying the three-dimensional virtual object based upon a greatest aspect ratio of the aspect ratios at the multiple axial positions.

11. The method of claim 1, further comprising obtaining the dimensional information from metadata for the three-dimensional virtual object.

12. The method of claim 1, further comprising obtaining the dimensional information from one or more of a data table and a database.

13. A display device comprising
a camera;
a display;
a logic subsystem; and
a storage subsystem comprising instructions that are executable by the logic subsystem to:
acquire, via the camera, image data imaging an environment;
receive a user input requesting display of a three-dimensional virtual object;
compare dimensional information for the three-dimensional virtual object to dimensional information for a field of view of the display device by rotating the three-dimensional virtual object around an axis and comparing aspect ratios at multiple axial positions;
modify the three-dimensional virtual object based upon comparing the dimensional information for the three-dimensional virtual object to the dimensional information for the field of view to obtain a modified three-dimensional virtual object; and
display the modified three-dimensional virtual object via the display.

14. The display device of claim 13, wherein the three-dimensional virtual object is a first three-dimensional virtual object, and wherein the instructions are further executable to receive a user input requesting display of a second three-dimensional virtual object, determining that the second three-dimensional virtual object is not to be modified and displaying the second three-dimensional virtual object without modifying the second three-dimensional virtual object.

15. The display device of claim 13, wherein the instructions are executable to compare the dimensional information for the three-dimensional virtual object to the dimensional information for the field of view by positioning the three-dimensional virtual object at a preselected virtual distance from the display device and comparing based upon the preselected virtual distance.

16. The display device of claim 13, wherein the instructions are executable to compare the dimensional information for the three-dimensional virtual object to the dimensional information for the field of view by comparing an aspect ratio of a bounding box defined around the three-dimensional virtual object to an aspect ratio of the field of view.

17. The display device of claim 13, wherein the instructions are executable to modify the three-dimensional virtual object the three-dimensional virtual object based upon a greatest aspect ratio of the aspect ratios at the multiple axial positions.

18. A computer-readable memory device comprising instructions that are executable by a computing device comprising a camera and a display to:
acquire, via the camera, image data imaging an environment;
receive a user input requesting display of a three-dimensional virtual object;
compare dimensional information for the three-dimensional virtual object to dimensional information for a field of view of the display device by rotating the three-dimensional virtual object around an axis and comparing aspect ratios at multiple axial positions;
modify the three-dimensional virtual object based upon comparing the dimensional information for the three-dimensional virtual object to the dimensional information for the field of view to obtain a modified three-dimensional virtual object; and
display the modified three-dimensional virtual object via the display.

19. The computer-readable memory device of claim 18, wherein the instructions are executable to compare the dimensional information for the three-dimensional virtual object to the dimensional information for the field of view by comparing an aspect ratio of a bounding box defined around the three-dimensional virtual object to an aspect ratio of the field of view.

20. The computer-readable memory device of claim 18, wherein the instructions are executable to modify the three-dimensional virtual object the three-dimensional virtual object based upon a greatest aspect ratio of the aspect ratios at the multiple axial positions.

* * * * *